May 1, 1951 H. A. SCHURICHT 2,550,941
BICYCLE FRAME
Filed May 24, 1948
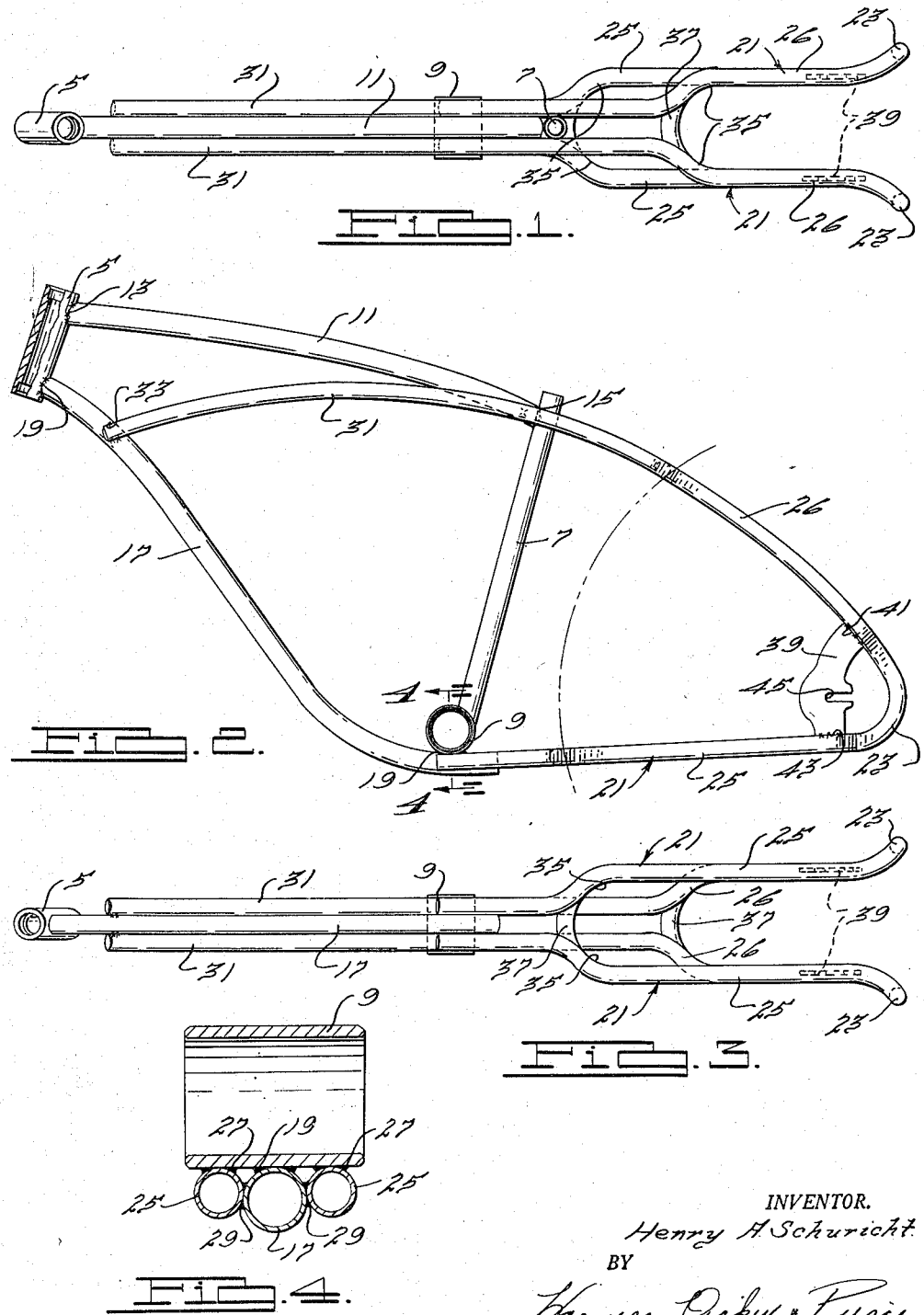
INVENTOR.
Henry A. Schuricht
BY
Harness, Dickey & Pierce
ATTORNEYS.

Patented May 1, 1951

2,550,941

UNITED STATES PATENT OFFICE 2,550,941

BICYCLE FRAME

Henry A. Schuricht, Pontiac, Mich., assignor to Whizzer Motor Company, Pontiac, Mich., a corporation of Delaware Application May 24, 1948, Serial No. 28,842

1 Claim. (Cl. 280—288)

This invention relates generally to bicycles, and more particularly to a novel bicycle frame.

It is an object of this invention to provide a novel bicycle frame which is more rigid and durable than any heretofore known in the art.

It is a further object of this invention to provide an improved bicycle frame of the aforementioned type having a pair of novel one-piece rear wheel fork members arranged so as to permit easy connection of a bicycle rear wheel axle thereto and so as to provide a bicycle frame which is especially strong, durable and inexpensive to manufacture.

Other objects of this invention will become apparent from the following detailed description taken in conjunction with the accompanying drawing in which:

Figure 1 is a top plan view of the bicycle frame of this invention;

Fig. 2 is a side elevational view of the structure illustrated in Fig. 1, with parts broken away in section;

Fig. 3 is a bottom plan view of the structure illustrated in Fig. 2; and

Fig. 4 is an enlarged sectional view of the structure illustrated in Fig. 2, taken along the line 4—4 thereof.

Referring now to the drawing, it will be seen that the bicycle frame of this invention includes a conventional tubular steering head 5, at the front end thereof, and a conventional tubular saddle post mast 7, intermediate the ends thereof, having a crank hanger 9 welded or otherwise suitably secured to its lower end. An upper reach tube 11 extends between the saddle post mast 7 and steering head 5, adjacent the upper ends thereof, and has its forward end welded or otherwise suitably secured at 13 to the steering head and its rear end welded or otherwise suitably secured to the saddle post mast at 15. A cambered lower reach tube 17 has its front end welded or otherwise suitably secured to the steering head 5 at 19, while its back end extends below and beyond the crank hanger 9 and is welded to the latter at 19.

A pair of one-piece, rear wheel fork members 21 are provided, each consisting of lower and upper fork portions 25 and 26, respectively, formed by bending at 23 a single tube in such a manner that the upper and lower fork portions are connected together at their rear ends at the point of bend. The front ends of the lower fork portions 25 extend forwardly from the bend to a point below the crank hanger 9 and are welded to the latter at 27, and to opposite sides of the rear portion of the lower reach tube 17, at 29. The upper fork portions 26 extend forwardly and upwardly from the bend 23 and are welded or otherwise suitably secured to opposite sides of the upper reach tube 11 at a point near the rear end of the latter. Integral extensions 31 of the upper fork portions 26 extend forwardly and downwardly from the rear portion of the upper reach tube and have their forward ends welded or otherwise suitably secured to the lower reach tube 17 at 33, adjacent the steering head 5. The upper and lower fork portions 26 and 25, rearwardly of the saddle post mast 7, are laterally offset at 35 so as to be sufficiently spaced for the reception of the bicycle rear wheel and fender, which are of conventional construction and hence not shown. The opposed fork portions are interconnected and braced, adjacent their points of offset, by means of tubular members 37.

Supporting elements 39 for the bicycle rear wheel axle extend substantially vertically between the upper and lower fork portions of each of the fork members across the arc of bend 23, and are welded thereto at 41 and 43, respectively. The supporting elements 39 are provided in a conventional manner with a rearwardly open horizontal slot 45 for the reception of the wheel axle of the bicycle rear wheel. The supporting elements 39 are connected to the fork members 21 forwardly of the bend 23, thereof, and the bent portions 23 are bent or flared outwardly so as to diverge laterally with respect to each other, and permit the axle of a bicycle wheel to be inserted forwardly therebetween and into the slots 45 in the supporting elements 39.

It will thus be seen that the strength and durability of the bicycle frame heretofore described is enhanced by the novel one-piece rear fork members. Likewise, it will be appreciated that by laterally diverging or flaring the bent portion 23 of the fork members the wheel axle may be easily connected to or disconnected from the supporting elements 39 in the usual manner by withdrawing the axle and attached wheel rearwardly. Furthermore, with this construction, the axle supporting elements are not the sole means of connection between the upper and lower portions of the fork members, as is the case in many bicycle frame constructions, so that the frame is much stronger and more durable than any of such conventional frames. The integral extensions 31 of the upper fork portions 26 also aid in the provision of an exceptionally rigid and strong bicycle frame construction, but such extensions are not essential and may be omitted, if desired.

I claim:

A bicycle frame, including a pair of one piece rear fork members bent intermediate their ends so that each member includes a lower fork portion extending forwardly from the bend and an upper fork portion extending forwardly from the bend, means interconnecting said fork members so as to provide a substantially rigid bicycle frame, and wheel axle supporting members connected to each of said fork members respectively between the upper and lower portions thereof and forwardly of said bent portion, said bent portion of said fork members diverging rearwardly and laterally with respect to each other, the rearward extremity of each fork member bent portion being disposed outwardly beyond the wheel axle supporting member connected therewith, and said fork member rearward extremities being spaced apart a greater distance than the length of a wheel axle to be supported by said members so as to permit a wheel axle to be inserted forwardly between said fork members, into supporting engagement with said wheel axle supporting members.

HENRY A. SCHURICHT.

REFERENCES CITED

The following references are of record in the file of this patent:

UNITED STATES PATENTS

| Number | Name | Date |
| --- | --- | --- |
| 2,151,533 | Schwinn | Mar. 21, 1939 |
| 2,250,805 | Lewinski | July 29, 1941 |
| 2,280,801 | Dempsey et al. | Apr. 28, 1942 |

FOREIGN PATENTS

| Number | Country | Date |
| --- | --- | --- |
| 528,018 | France | Aug. 6, 1921 |